(12) United States Patent
Zuritis

(10) Patent No.: US 8,776,454 B2
(45) Date of Patent: Jul. 15, 2014

(54) SOLAR ARRAY SUPPORT STRUCTURE, MOUNTING RAIL AND METHOD OF INSTALLATION THEREOF

(76) Inventor: Michael Zuritis, Ballston Lake, NY (US)

( * ) Notice: Subject to any disclaimer, the term of this patent is extended or adjusted under 35 U.S.C. 154(b) by 398 days.

(21) Appl. No.: 13/079,947

(22) Filed: Apr. 5, 2011

(65) Prior Publication Data
US 2012/0073219 A1 Mar. 29, 2012

(51) Int. Cl.
| *F16M 13/00* | (2006.01) |
| *E04B 1/38* | (2006.01) |
| *F24J 2/52* | (2006.01) |
| *H01L 31/042* | (2014.01) |
| *B23P 11/00* | (2006.01) |

(52) U.S. Cl.
USPC ......... 52/173.3; 52/655.1; 126/621; 136/244; 248/218.4; 248/219.4; 248/237; 248/545; 403/205

(58) Field of Classification Search
CPC .......... Y02E 10/47; F24J 2/526; F24J 2/5232; F24J 2/5258; F24J 2/5207; E04B 2001/2415; E04B 2001/2418; E04B 2001/2457
USPC .............. 52/173.3, 655.1; 126/621, 622, 623; 136/244, 251; 248/218.4, 219.1, 219.4, 248/228.6, 230.6, 237, 530, 545; 403/205
See application file for complete search history.

(56) References Cited

U.S. PATENT DOCUMENTS

| 3,844,086 | A | * | 10/1974 | Radtke ........................ 52/745.15 |
| 3,844,087 | A | * | 10/1974 | Schultz et al. .................. 52/200 |
| D242,626 | S | * | 12/1976 | Scrivener ...................... D25/123 |
| 4,167,033 | A | * | 9/1979 | Fletcher ......................... 362/396 |
| 4,226,506 | A | * | 10/1980 | Auger ............................ 359/852 |
| 4,269,173 | A | * | 5/1981 | Krueger et al. ................ 126/634 |
| 4,284,070 | A | * | 8/1981 | Wilke ............................ 126/710 |
| 4,319,844 | A | * | 3/1982 | Auger ............................ 356/399 |
| 4,372,292 | A |   | 2/1983 | Ort |
| 4,374,406 | A | * | 2/1983 | Hepp ............................ 362/253 |
| D270,660 | S |   | 9/1983 | Ort |
| D300,063 | S |   | 2/1989 | Sheltra |
| D312,315 | S |   | 11/1990 | Westphal et al. |
| 5,295,646 | A | * | 3/1994 | Roth ............................... 248/58 |

(Continued)

FOREIGN PATENT DOCUMENTS

| FR | 2989154 A1 | * | 10/2013 |
| JP | 2006144268 A | * | 6/2006 |
| WO | WO 2012136278 A1 | * | 10/2012 |
| WO | WO 2013078533 A1 | * | 6/2013 |

*Primary Examiner* — Basil Katcheves
*Assistant Examiner* — Rodney Mintz
(74) *Attorney, Agent, or Firm* — Schmeiser, Olsen & Watts LLP

(57) ABSTRACT

Disclosed herein is a mounting rail for a solar array support structure that includes a main body having a top and a bottom, the main body extending from a first end to a second end, the main body including a dual web having a first vertical element and a second vertical element. Further, the mounting rail includes a solar panel mounting portion extending along the top of the main body, the solar panel mounting portion configured to secure the solar panel to the mounting rail. Finally, the mounting rail includes a first flange extending from the bottom of the first vertical element, the first flange including a first pair of holes configured to receive two ends of a U-bolt, the first pair of holes spaced apart substantially equal to a width of a horizontal rail of a solar array support structure.

10 Claims, 8 Drawing Sheets

(56) References Cited

U.S. PATENT DOCUMENTS

| | | | |
|---|---|---|---|
| D348,939 S | 7/1994 | Larsson et al. | |
| 5,647,915 A * | 7/1997 | Zukerman | 136/251 |
| D407,504 S | 3/1999 | Hersh et al. | |
| 6,082,060 A * | 7/2000 | Bauer et al. | 52/173.3 |
| 6,093,884 A * | 7/2000 | Toyomura et al. | 136/244 |
| 6,205,719 B1 * | 3/2001 | Bruce | 52/147 |
| 6,302,238 B1 * | 10/2001 | Preusser et al. | 182/150 |
| 6,370,828 B1 * | 4/2002 | Genschorek | 52/200 |
| 6,617,507 B2 | 9/2003 | Mapes et al. | |
| 6,672,018 B2 | 1/2004 | Shingleton | |
| 6,799,398 B1 * | 10/2004 | Plevyak | 52/173.3 |
| 6,959,517 B2 * | 11/2005 | Poddany et al. | 52/173.3 |
| 7,260,918 B2 * | 8/2007 | Liebendorfer | 52/173.3 |
| D568,707 S | 5/2008 | Weiby | |
| 7,481,211 B2 | 1/2009 | Klein | |
| 7,557,292 B2 * | 7/2009 | Shingleton et al. | 136/246 |
| D598,574 S | 8/2009 | Bergmann | |
| 7,634,875 B2 * | 12/2009 | Genschorek | 52/173.3 |
| 7,690,161 B2 * | 4/2010 | McPherson | 52/208 |
| D621,962 S | 8/2010 | Deleu | |
| 7,797,883 B2 * | 9/2010 | Tarbell et al. | 52/27 |
| 7,807,918 B2 * | 10/2010 | Shingleton et al. | 136/243 |
| D627,717 S * | 11/2010 | Munoz et al. | D13/102 |
| 7,856,769 B2 * | 12/2010 | Plaisted et al. | 52/173.3 |
| 7,888,587 B2 * | 2/2011 | Shingleton et al. | 136/246 |
| 8,104,239 B2 * | 1/2012 | Fath | 52/173.3 |
| 8,109,048 B2 * | 2/2012 | West et al. | 52/173.3 |
| 8,181,402 B2 * | 5/2012 | Tsuzuki et al. | 52/173.3 |
| 8,181,926 B2 * | 5/2012 | Magno et al. | 248/237 |
| 8,191,321 B2 * | 6/2012 | McClellan et al. | 52/173.3 |
| 8,250,829 B2 * | 8/2012 | McPheeters et al. | 52/710 |
| 8,251,326 B2 * | 8/2012 | McPheeters | 248/228.2 |
| 8,256,170 B2 * | 9/2012 | Plaisted et al. | 52/173.3 |
| 8,266,846 B2 * | 9/2012 | Schoell | 52/173.3 |
| 8,291,653 B2 * | 10/2012 | Suarez et al. | 52/173.3 |
| 8,307,606 B1 * | 11/2012 | Rego et al. | 52/747.1 |
| 8,316,618 B1 * | 11/2012 | Rodowca et al. | 52/747.1 |
| 8,316,619 B1 * | 11/2012 | Rego et al. | 52/747.1 |
| 8,336,277 B1 * | 12/2012 | Rego et al. | 52/747.1 |
| 8,375,654 B1 * | 2/2013 | West et al. | 52/173.3 |
| 8,376,298 B2 * | 2/2013 | McPheeters | 248/231.41 |
| 8,387,319 B1 * | 3/2013 | Gilles-Gagnon et al. | 52/173.3 |
| 8,404,963 B2 * | 3/2013 | Kobayashi | 136/244 |
| 8,413,391 B2 * | 4/2013 | Seery et al. | 52/173.3 |
| 8,413,944 B2 * | 4/2013 | Harberts et al. | 248/500 |
| 8,468,755 B2 * | 6/2013 | Zuritis | 52/173.3 |
| 8,480,041 B2 * | 7/2013 | Myers | 248/72 |
| 8,505,863 B2 * | 8/2013 | McPheeters | 248/228.2 |
| 8,511,009 B2 * | 8/2013 | Kobayashi et al. | 52/173.3 |
| 8,544,221 B2 * | 10/2013 | Marley | 52/173.3 |
| 8,550,419 B2 * | 10/2013 | Hausner et al. | 248/370 |
| 8,595,997 B2 * | 12/2013 | Wu | 52/173.3 |
| 8,621,792 B2 * | 1/2014 | Zante | 52/173.3 |
| 8,650,812 B2 * | 2/2014 | Cusson | 52/173.3 |
| 8,661,747 B2 * | 3/2014 | Eide | 52/173.3 |
| 8,671,631 B2 * | 3/2014 | Schroeder et al. | 52/173.3 |
| 8,683,760 B2 * | 4/2014 | Segers | 52/173.3 |
| 8,695,290 B1 * | 4/2014 | Kim et al. | 52/173.3 |
| 2003/0201009 A1 * | 10/2003 | Nakajima et al. | 136/251 |
| 2004/0025459 A1 * | 2/2004 | Huebner et al. | 52/282.1 |
| 2004/0261955 A1 * | 12/2004 | Shingleton et al. | 160/84.06 |
| 2005/0109384 A1 * | 5/2005 | Shingleton et al. | 136/244 |
| 2006/0156651 A1 * | 7/2006 | Genschorek | 52/200 |
| 2008/0010915 A1 * | 1/2008 | Liebendorfer | 52/173.3 |
| 2008/0053517 A1 * | 3/2008 | Plaisted et al. | 136/251 |
| 2008/0246263 A1 * | 10/2008 | McPherson | 280/798 |
| 2008/0302407 A1 | 12/2008 | Kobayashi | |
| 2009/0166494 A1 * | 7/2009 | Bartelt-Muszynski et al. | 248/237 |
| 2009/0282755 A1 * | 11/2009 | Abbott et al. | 52/173.3 |
| 2009/0293941 A1 * | 12/2009 | Luch | 136/251 |
| 2010/0065108 A1 * | 3/2010 | West et al. | 136/251 |
| 2010/0089389 A1 * | 4/2010 | Seery et al. | 126/608 |
| 2010/0108118 A1 * | 5/2010 | Luch | 136/244 |
| 2010/0132693 A1 | 6/2010 | Schnitzer | |
| 2010/0180933 A1 * | 7/2010 | Aftanas et al. | 136/251 |
| 2010/0257812 A1 * | 10/2010 | Schultz et al. | 52/704 |
| 2010/0263297 A1 * | 10/2010 | Liebendorfer | 52/11 |
| 2010/0269447 A1 * | 10/2010 | Schuit et al. | 52/698 |
| 2010/0276558 A1 * | 11/2010 | Faust et al. | 248/222.14 |
| 2010/0284737 A1 * | 11/2010 | McPheeters | 403/374.3 |
| 2010/0299891 A1 * | 12/2010 | Myers | 24/457 |
| 2010/0313506 A1 * | 12/2010 | Schoell | 52/302.1 |
| 2010/0319277 A1 * | 12/2010 | Suarez et al. | 52/173.3 |
| 2011/0005512 A1 * | 1/2011 | Ruesswick | 126/600 |
| 2011/0023390 A1 * | 2/2011 | Kneip et al. | 52/173.3 |
| 2011/0067749 A1 * | 3/2011 | Zuritis | 136/246 |
| 2011/0138585 A1 * | 6/2011 | Kmita et al. | 24/522 |
| 2011/0174947 A1 * | 7/2011 | Wu | 248/226.11 |
| 2011/0181018 A1 * | 7/2011 | Bruneau | 280/414.1 |
| 2011/0242689 A1 * | 10/2011 | Lovegrove et al. | 359/853 |
| 2011/0253190 A1 * | 10/2011 | Farnham, Jr. | 136/244 |
| 2011/0284708 A1 * | 11/2011 | McPheeters | 248/226.11 |
| 2011/0296773 A1 * | 12/2011 | Kellerman | 52/173.3 |
| 2011/0302857 A1 * | 12/2011 | McClellan et al. | 52/173.3 |
| 2011/0302859 A1 * | 12/2011 | Crasnianski | 52/173.3 |
| 2012/0017526 A1 * | 1/2012 | Eide | 52/173.3 |
| 2012/0073563 A1 * | 3/2012 | Zuritis | 126/569 |
| 2012/0074079 A1 * | 3/2012 | Marley | 211/41.1 |
| 2012/0085394 A1 * | 4/2012 | McPheeters et al. | 136/251 |
| 2012/0090665 A1 * | 4/2012 | Zuritis | 136/251 |
| 2012/0091077 A1 * | 4/2012 | Zuritis | 211/41.1 |
| 2012/0117895 A1 * | 5/2012 | Li | 52/173.3 |
| 2012/0124922 A1 * | 5/2012 | Cusson et al. | 52/173.3 |
| 2012/0125410 A1 * | 5/2012 | West et al. | 136/251 |
| 2012/0145848 A1 * | 6/2012 | Schuff et al. | 248/219.2 |
| 2012/0175322 A1 * | 7/2012 | Park et al. | 211/41.1 |
| 2012/0180406 A1 * | 7/2012 | Kobayashi | 52/173.3 |
| 2012/0227791 A1 * | 9/2012 | Vari | 136/251 |
| 2012/0255598 A1 * | 10/2012 | West | 136/251 |
| 2012/0260972 A1 * | 10/2012 | West et al. | 136/251 |
| 2012/0267328 A1 * | 10/2012 | McPheeters | 211/41.1 |
| 2012/0279558 A1 * | 11/2012 | West et al. | 136/251 |
| 2012/0291374 A1 * | 11/2012 | Zante | 52/173.3 |
| 2012/0298186 A1 * | 11/2012 | West | 136/251 |
| 2012/0298188 A1 * | 11/2012 | West et al. | 136/251 |
| 2012/0312945 A1 * | 12/2012 | McPheeters | 248/228.2 |
| 2012/0325761 A1 * | 12/2012 | Kubsch et al. | 211/41.1 |
| 2013/0008103 A1 * | 1/2013 | Sagayama | 52/173.3 |
| 2013/0008490 A1 * | 1/2013 | Rego et al. | 136/251 |
| 2013/0011187 A1 * | 1/2013 | Schuit et al. | 403/287 |
| 2013/0036685 A1 * | 2/2013 | Suarez et al. | 52/173.3 |
| 2013/0055662 A1 * | 3/2013 | Gilles-Gagnon et al. | 52/173.3 |
| 2013/0104471 A1 * | 5/2013 | Kobayashi | 52/173.3 |
| 2013/0112248 A1 * | 5/2013 | McPheeters | 136/251 |
| 2013/0139870 A1 * | 6/2013 | Nuernberger et al. | 136/251 |
| 2013/0141845 A1 * | 6/2013 | Nuernberger et al. | 361/679.01 |
| 2013/0167967 A1 * | 7/2013 | Bitarchas et al. | 136/251 |
| 2013/0180572 A1 * | 7/2013 | West | 136/251 |
| 2013/0180573 A1 * | 7/2013 | West | 136/251 |
| 2013/0180574 A1 * | 7/2013 | West et al. | 136/251 |
| 2013/0216300 A1 * | 8/2013 | Braeutigam | 403/205 |
| 2014/0053891 A1 * | 2/2014 | West et al. | 136/251 |
| 2014/0069877 A1 * | 3/2014 | McPheeters | 211/26 |

* cited by examiner

SOLAR ARRAY SUPPORT STRUCTURE, MOUNTING RAIL AND METHOD OF INSTALLATION THEREOF

FIELD OF TECHNOLOGY

The subject matter disclosed herein relates generally to solar arrays. More particularly, the subject matter relates to the construction of a solar array support structure, including a rail for the attachment of solar panels, and a method of installation thereof.

BACKGROUND

Renewable energy sources are becoming more popular with the rising cost of oil and other non-renewable energy resources. Solar energy is one of the renewable energy sources and has proven desirable to harness. One method of harnessing solar energy is to install a structural array of solar panels, or a solar array, such that the solar panels each face the sun to achieve sunlight absorption. Many solar arrays include a combination of columns that extend from the ground, horizontal rails that extend between the columns, and mounting rails or bars that are attachable above the horizontal rails. Solar panels are then attached to the mounting rails with clamps.

A typical prior art solar array support structure 200 is shown in FIG. 1. Prior art solar array systems such as the solar array support structure 200 shown in this Figure require an additional angle iron component 210 in order to attach a mounting rail 212 above a horizontal rail 214 with a U-bolt 216. To accomplish this, the angle iron 210 attaches to the horizontal rail 214 with the U-bolt 216, and then the mounting rail 212 is bolted to the angle iron 210 with bolts 218. The angle irons 210 in these prior art solar array support structures 200 add a significant amount of cost to the construction and raw materials of the entire system.

Thus, an improved solar array support structure, mounting rail, and method of installation thereof, would be well received in the art.

SUMMARY

According to a first described aspect a mounting rail for a solar array support structure comprises: a main body having a top and a bottom, the main body extending from a first end to a second end, the main body including a dual web having a first vertical element and a second vertical element; a solar panel mounting portion extending along the top of the main body, the solar panel mounting portion configured to secure the solar panel to the mounting rail; and a first flange extending from the bottom of the first vertical element, the first flange including a first pair of holes configured to receive two ends of a U-bolt, the first pair of holes spaced apart substantially equal to a width of a horizontal rail of a solar array support structure.

According to a second described aspect a solar array support structure comprises: a vertical support column extending from a ground; a horizontal rail attached to the vertical support column; a mounting rail extending from a first end to a second end and including a top and a bottom, the mounting rail further including: a first vertical element; a solar panel mounting portion extending along the top of the main body, the solar panel mounting portion configured to secure the solar panel to the mounting rail; and a first flange extending from the bottom of the first vertical element, the first flange including a first pair of holes spaced apart corresponding to a width of the horizontal rail; a U-bolt attaching the horizontal rail with the mounting rail; and a solar panel attached to the mounting rail with the attachment mechanism.

According to a third described aspect a method of installing a solar array support structure comprises: locating a mounting rail in the proximity to a horizontal rail of the solar array support structure; cradling the horizontal rail with a U-bolt; inserting each end of a U-bolt within a corresponding hole of the mounting rail; and securely attaching the mounting rail directly to the horizontal rail.

According to a fourth described aspect, a solar array support structure comprises a vertical support column extending from a ground; a horizontal rail attached to the vertical support column; a mounting rail extending from a first end to a second end and including a top and a bottom, the mounting rail further including: a first vertical element; a first channel extending along the top of the mounting rail, the channel configured to retainably receive an attachment mechanism; and a first flange extending from the bottom of the first vertical element; a clamping element having two openings; a U-bolt extending through the two openings of the clamping element, wherein the U-bolt attaches the horizontal rail with the mounting rail, and wherein the U-bolt further attaches the clamping element to the first flange; and a solar panel attached to the mounting rail with the attachment mechanism.

BRIEF DESCRIPTION OF THE DRAWINGS

The subject matter disclosed herein is distinctly claimed in the claims at the conclusion of the specification. The foregoing and other features and advantages are apparent from the following detailed description taken in conjunction with the accompanying drawings in which:

DETAILED DESCRIPTION

A detailed description of the hereinafter described embodiments of the disclosed apparatus and method are presented herein by way of exemplification and not limitation with reference to the Figures.

Figure 2:
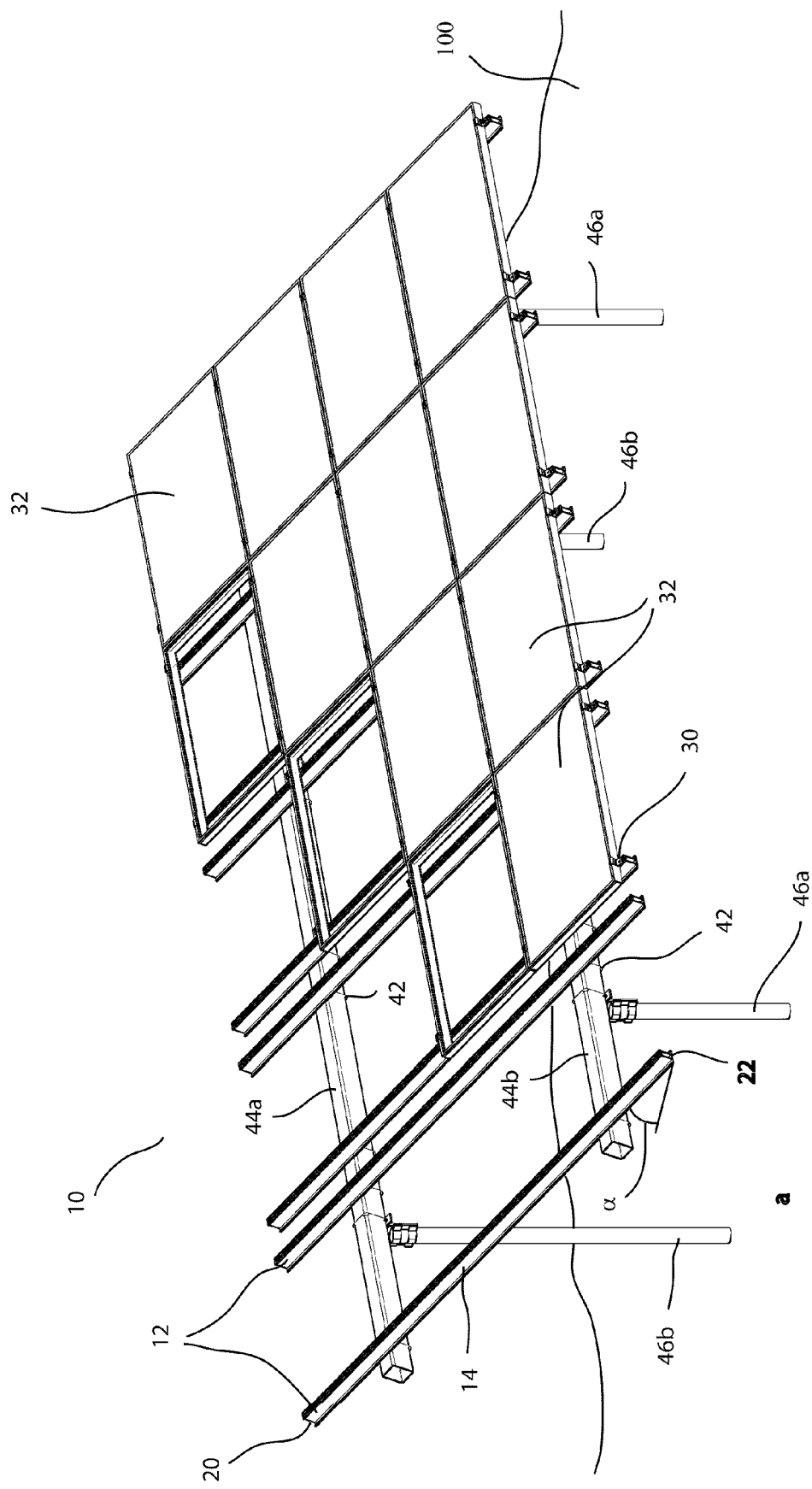
FIG. 2 depicts a perspective view of a solar panel mounted on a solar array support structure that includes a plurality of mounting rails in accordance with one embodiment.
Figure 3:
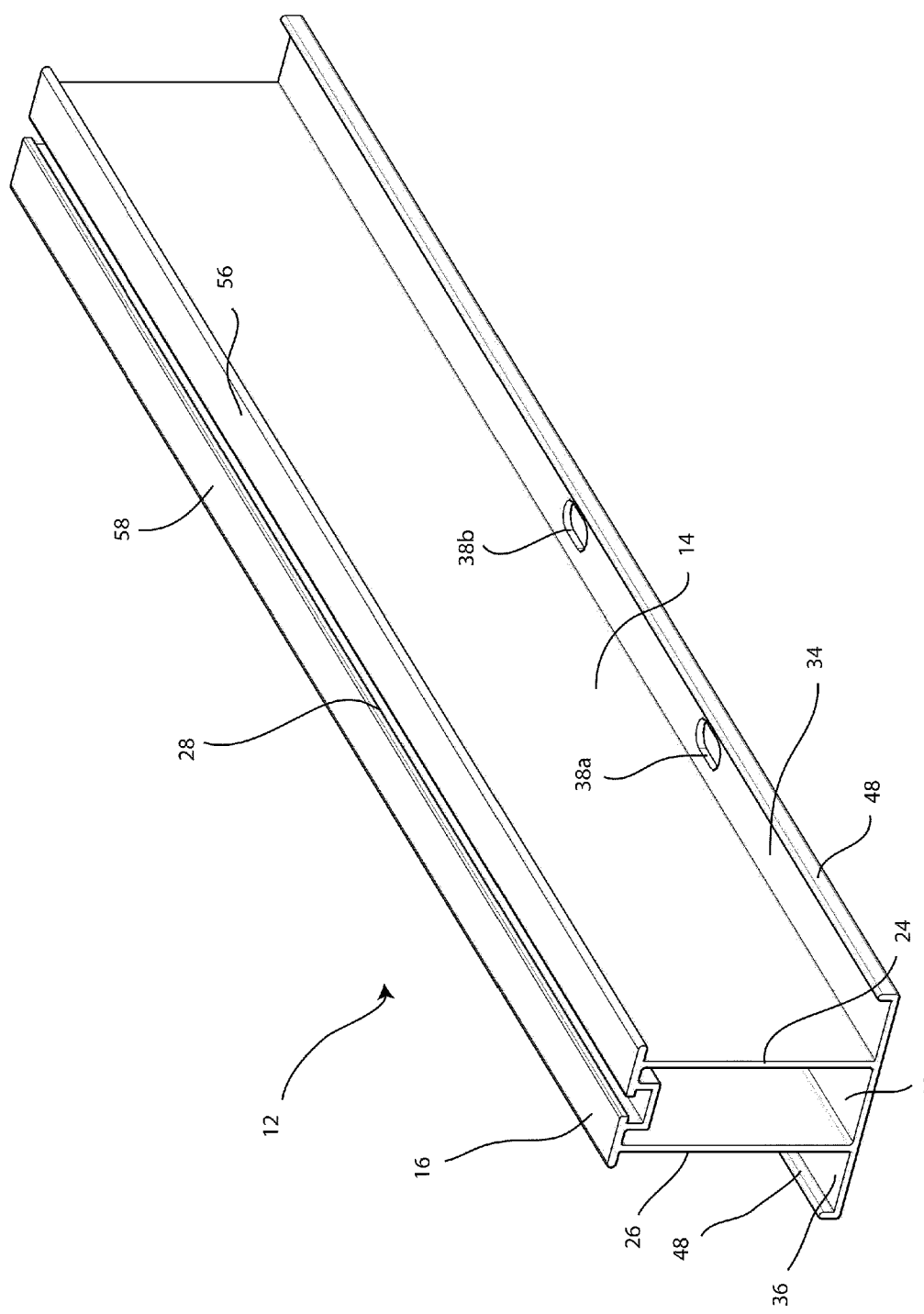
FIG. 3 depicts a perspective view of one the mounting rails of FIG. 2 structure.

Referring firstly to FIGS. 2-3, a solar array support structure 10 is shown according to one described embodiment after having been installed in the ground 100. The solar array support structure 10 includes a plurality of mounting rails 12.

Figure 1:
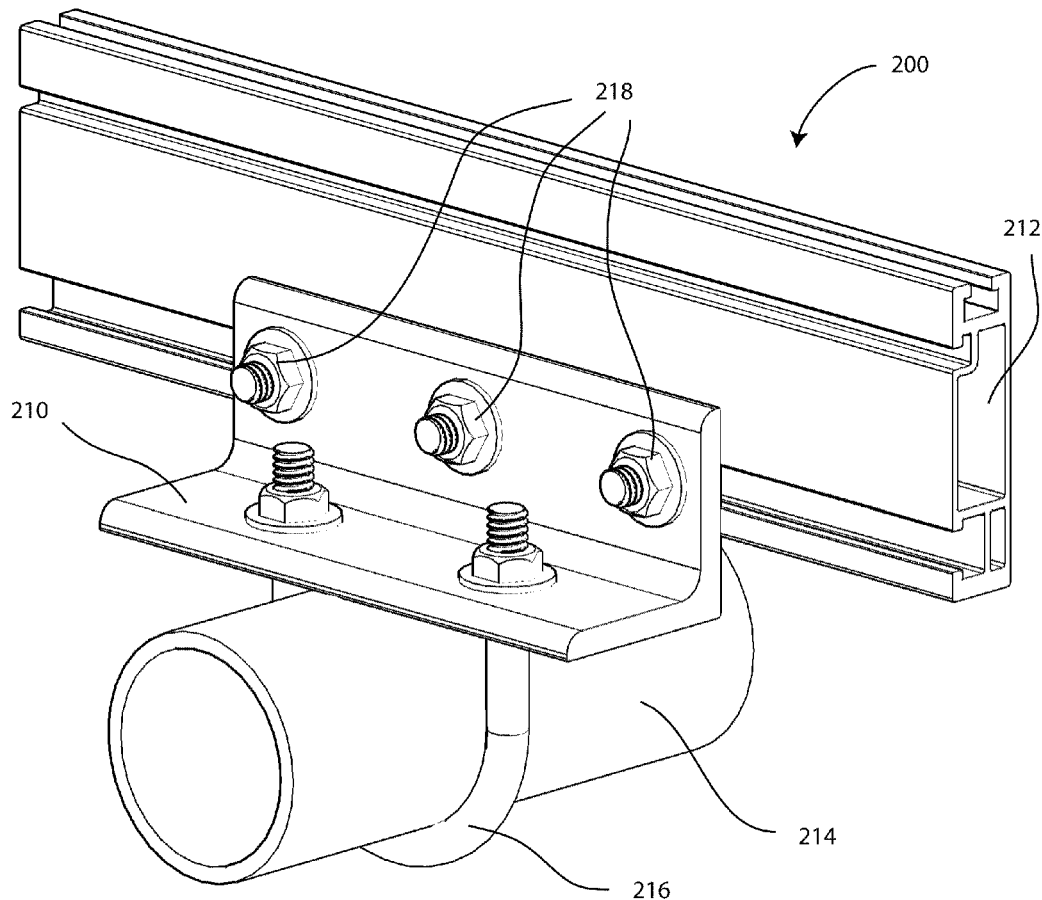
FIG. 1 depicts a prior art solar array support structure that includes an angle iron linking component.

The mounting rails 12 each include a main body 14 having a top 16 and a bottom 18. The main body 14 extends from a first end 20 to a second end 22. The mounting rail 12 has a dual web cross section that includes a first vertical element 24 and a second vertical element 26. Furthermore, the mounting rail 12 includes a channel 28 extending along the top 16 that is configured to retainably receive an attachment mechanism 30 for attaching a solar panel 32 to the mounting rail 12. The mounting rail 12 is also shown including a first flange 34 and a second flange 36 extending from the bottom of the first and second vertical elements 24, 26, respectively. The flanges 34, 36 are each shown including a pair of openings 38. Each pair of openings comprises a first opening 38a, and a second opening 38b spaced apart substantially equal to a width of a horizontal rail 44 of the solar array support structure 10. While only a single pair of openings 38 is shown in FIG. 3, it should be understood that pairs of openings may be located on each of the flanges 34, 36, and on each of the ends 20, 22. Thus, four or more of the pairs of openings 38 may be located on each of the rails 12. The pairs of openings 38 are each configured to receive two ends of a U-bolt 42. Thus, the mounting rail 12 may be securely attached directly to two horizontal rails 44a, 44b with the U-bolts 42, without any additional angle iron linking components such as the angle iron 210 shown in FIG. 1.

The solar array support structure 10 includes a plurality of vertical support columns 46 extending from the ground 100. In the embodiment shown, a plurality of front support columns 46a extend substantially vertically from the ground to a bottom horizontal rail 44b, while a plurality of rear support columns 46b extend substantially vertically from the ground to a top horizontal rail 44a. The support columns 46 may be installed within the ground 100 such that the solar array support structure may be secured therein. The top and bottom horizontal rails 44a, 44b may be at respective heights such that when several of the mounting rails 12 are attached thereto, they extend above the ground at a predetermined angle θ. The solar array support structure 10 is not limited to the embodiment shown in FIG. 1, however. For example, the solar array support structure 100 may be automatically adjustable in tilt and height with telescopic rails and columns. Many other embodiments would be apparent to those skilled in the art. Whatever the construction of the solar array support structure 10, the vertical support columns 46 and horizontal rails 44 are configured to hold the mounting rails 12 above the ground when the solar array support structure 10 is installed.

The rails 12, 44, and the columns 46, and the various other components of the solar array support structure 100 may be manufactured from aluminum, steel, stainless steel or other like materials that are robust enough to support the solar panels 32. Furthermore, the terms "rail" and "column" are also used for illustrative purposes. It should be understood that the horizontal rails 14 and the vertical columns 46 of the solar array support structure 100 may also be referred to as bars, rails, poles, shafts, pipes, tubes, beams, columns and the like in any configuration that would be apparent to those skilled in the art.

The solar array support structure 10 further includes the mounting rails 12 attached to the horizontal rails 44a, 44b with the U-bolts 42. The mounting rails 12 are particularly shown in FIG. 3. It should be understood that the mounting rails 12 contemplated herein are the type of rails upon which solar panels are directly mounted. The mounting rails 12 may be attached perpendicularly between two horizontal rails 44a, 44b, although the disclosure is not limited to this embodiment. The mounting rails 12 may further be longer or shorter than the embodiment shown in order to accommodate different solar array support structures.

The mounting rails 12 are shown including the two flanges 34, 36. The first flange 34 extends from the bottom of the first vertical element 24, and the second flange 36 extends from the bottom of the second vertical element 26. However, in one embodiment, the mounting rails 12 only include a single flange. As shown in the Figures, the flanges 34, 36 may extend perpendicularly from the vertical elements 36. While the embodiment depicted includes a dual web with two vertical elements 24, 26, this is not limiting. A single web design is also contemplated with a singular vertical element (not shown). The flanges 34, 36 may extend from the bottom of the vertical elements 24, 26 about half of the length of the vertical elements 24, 26. Furthermore, the flanges 34, 36 may extend to vertical bends 48. The vertical bends 48 may provide structural stability for the mounting rails 12. Furthermore, the vertical bends 48 may provide for a conduit or channel within which a supporting clamping element 50 or 66 may rest (shown in FIGS. 6-7).

The flanges 34, 36 may also include the pairs of openings 38. The openings 38 may also be bores, holes, gaps, punctures, apertures, cavities or the like. The openings 38 may further be sized particularly to accept the ends of one of the U-bolts 42. Nuts 51 may be used to secure the U-bolts 42 in position in the openings 38. In the case that the mounting rails 12 are installed at an angle to the horizontal rails 44, the openings 38 may be bored into the flanges at a similar angle. Further, a first pair of openings 38 may be separated by a second pair of openings (not shown) on the first flange 34 by a predetermined distance. Similarly a third pair of openings (not shown) may be separated by a fourth pair of openings (not shown) on the second flange 36 by a predetermined distance. These predetermined distances may be particular to the eventual distance between the horizontal rails 44. Further, the distances between the openings 38 may be the same on both flanges 34, 36. While the embodiment shown may include two pairs of openings 38 within the first flange 34, and two pairs of openings 38 within the second flange, this is not limiting. Several pairs of openings may be located across the length of the flange. Alternately, a set of openings (not shown) may comprise openings all the way across the flange at regular intervals. The regular intervals may correspond substantially to the width of a horizontal rail 44 of the solar array support structure 10.

The mounting rail 12 may further include the channel 28 extending along the top 16. The channel 28 may also be a conduit, duct, groove, duct, or the like. The channel 28 may be configured to retainably receive the attachment mechanism 30 for attaching the solar panel 32 to the mounting rail 12. In one embodiment, the channel 28 may not run the entire length of the mounting rail 12, but instead simply be a location where the attachment mechanism can attach to the mounting rail 12. The channel 28 may be integrated into the top 16 of the main body 14 such that the cross section of the main body 14 is fully enclosed to retain the structural integrity of the mounting rail 12. However, the channel 28 may extend within the rectangular cross section defined between the vertical elements 24, 26.

Furthermore, in other embodiments (not shown), the mounting rail does not include a channel that is receptive of a separate attachment mechanism, such as the channel 28. Instead, the mounting rail may be a solar panel mounting portion extending along the top of the main body that is configured to directly secure the solar panel to the mounting rail. For example, the mounting rail may be particularly fashioned to directly receive a solar panel without any bolts or clamps. The mounting rail 12 may provide for any form of mounting of solar panels that may be known to those skilled in the art.

Figure 4:
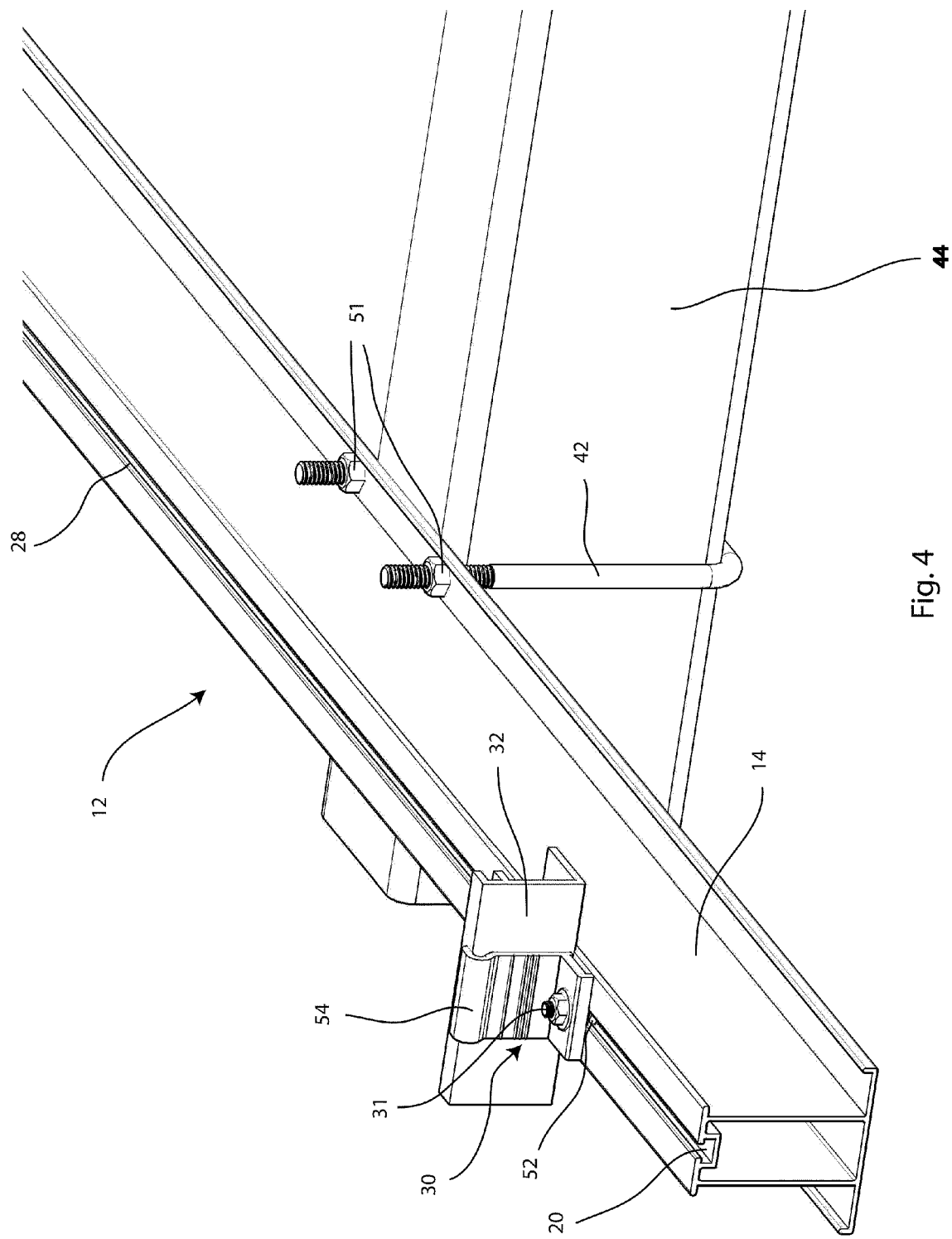
FIG. 4 depicts a perspective view of the mounting rail of FIG. 3 attached to a horizontal rail of a solar array support structure.

Referring now to FIG. 4, the attachment mechanism 30 may comprise a bolt 31, as shown in the Figures. Thus, the channel 28 may be configured to receive a head 52 from at least one of the first end 20 and the second end 22. The head 52 may be slidably retained within the channel 28 so that the bolt extends from the channel above the top of the main body 14 for attachment with a clamp 54 (shown in FIGS. 4-7). Also shown is cutaway portion of the solar panel 32 for exemplary purposes. This shows that the clamps 54 may be configured to grip the solar panels 32. However, in the FIGS. 4-7, it should be understood that the majority of the solar panels 32 are not shown in order to reveal the mounting rail 12 underneath. While the embodiment depicted in the Figures shows a bolt, it should be understood that other types of attachment mechanisms are also contemplated that would provide attachment to clamps for attaching the solar panels 32.

Referring back to FIG. 3, the mounting rail 12 may include a first projection 56 extending from the top 16 of the first vertical element 24 and a second projection 58 extending from the top 16 of the second vertical element 26. The first and second projections 56, 58 may not extend from the vertical elements 24, 26 very far and may simply provide structural integrity to the mounting rail 12. The first and second upper projections 56, 58 may extend perpendicular from the vertical elements 24, 26 in a similar manner to the flanges 34, 36. However, the flanges 34, 36 may extend from the vertical elements 24, 26 a greater distance than the first and second projections. It should further be understood that other embodiments of the mounting rail 12 may not include the first and second projections 56, 58. In other embodiments, the mounting rail 12 may instead include other cross sectional features that provide additional structural integrity.

Figure 5:
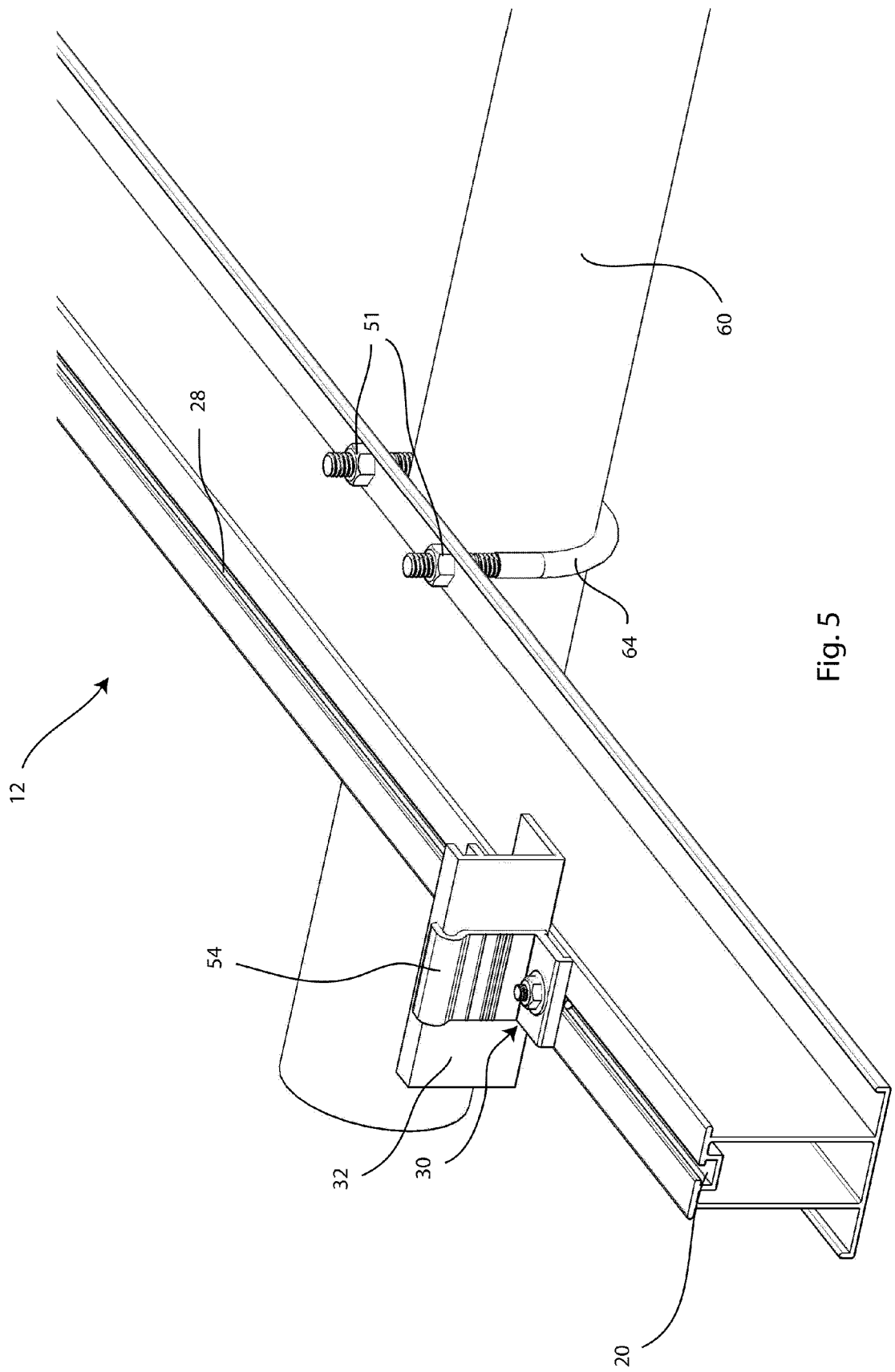
FIG. 5 depicts a perspective view of the mounting rail of FIGS. 3-4 attached to another horizontal rail of a solar array support structure.

Shown in FIG. 4, the solar array support structure 10 may include horizontal rails 44a, 44b that have a rectangular cross section. In this case, the U-bolts 42 used to mount the mounting rails 12 to the horizontal rails 44 may also be right angled rather than rounded. Alternately, the solar array support structure 10 may include horizontal rails 60 that have a circular cross section, as shown in FIG. 5. In this case, the solar array support structure 10 may include rounded U-bolts 64. It should be understood that these embodiments are not limiting and that other horizontal rail cross sections and accompanying U-bolts are contemplated. Furthermore, the U-bolts may be any other type of connection mechanism for attaching the horizontal rails to the mounting rails 12 through the openings in the mounting rails 12.

Figure 6:
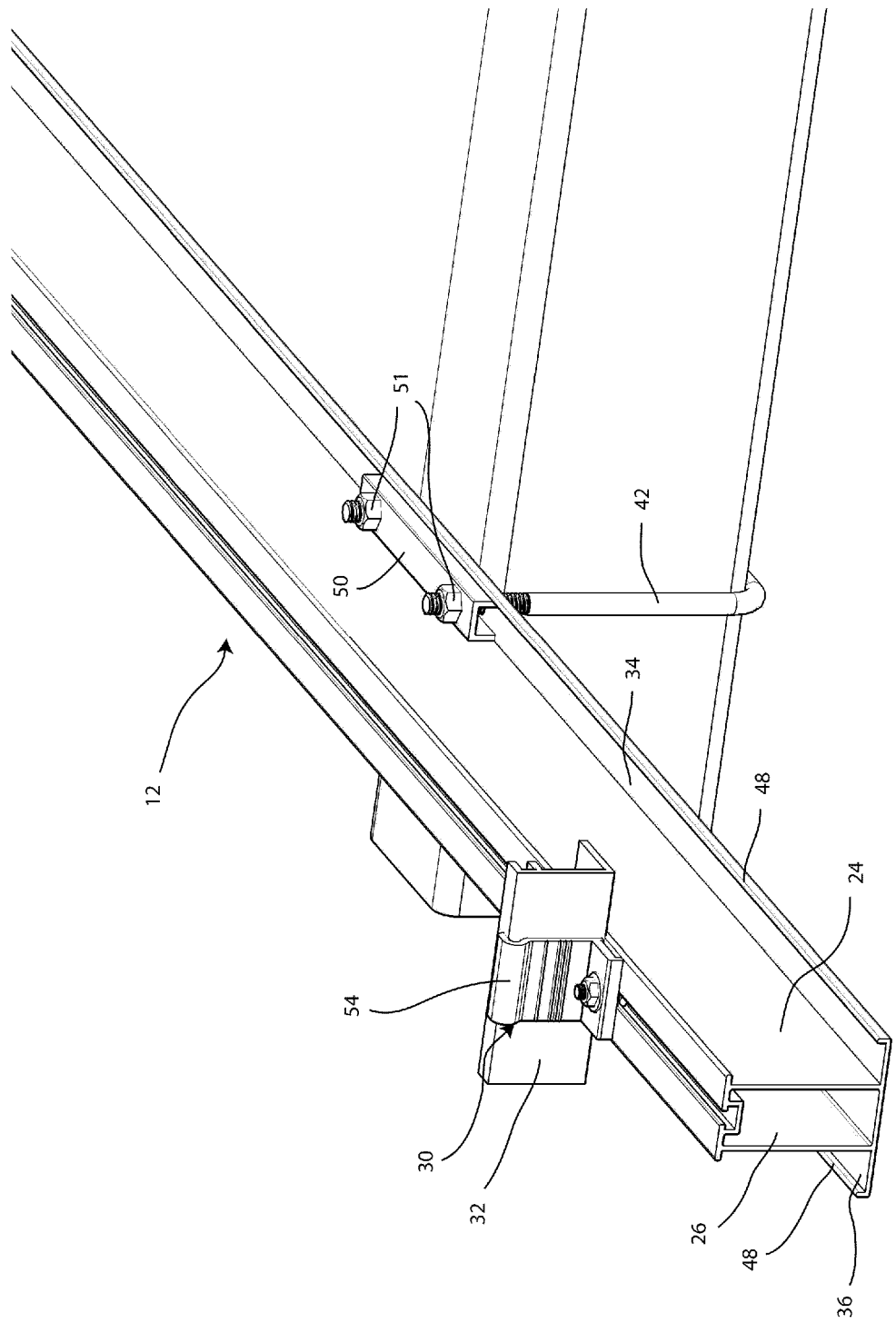
FIG. 6 depicts an enlarged perspective view of an attachment location of the mounting rail of FIGS. 2-5 attached to a horizontal rail with a U-bolt and a saddle clamp.

Referring to FIG. 6, the solar array support structure may utilize clamping elements, such as the clamping element 50 in order to help support the connection between the U-bolt 42 and the mounting rails 12. Like the flanges 34, 36, the clamping element 50 may include openings to receive the ends of the U-bolts 42, 64. Thus, the openings in the clamping element 50 may be similarly spaced to the openings 38 of the flanges 34, 36. The clamping element 50 may be held within the small channel formed between the vertical elements 24, 26 and the vertical bend 48 at the end of the flanges 34, 36. The clamping element 50 may act to help retain the U-bolt 42, 64 in position and further may act as a washer to spread out the pressure of the nuts 51 onto a larger area of the flanges 34, 36. In another embodiment, actual washers are utilized in order to attach the ends of the U-bolts 42, 64 to the flanges 34, 36 with the nuts 51.

Figure 7:
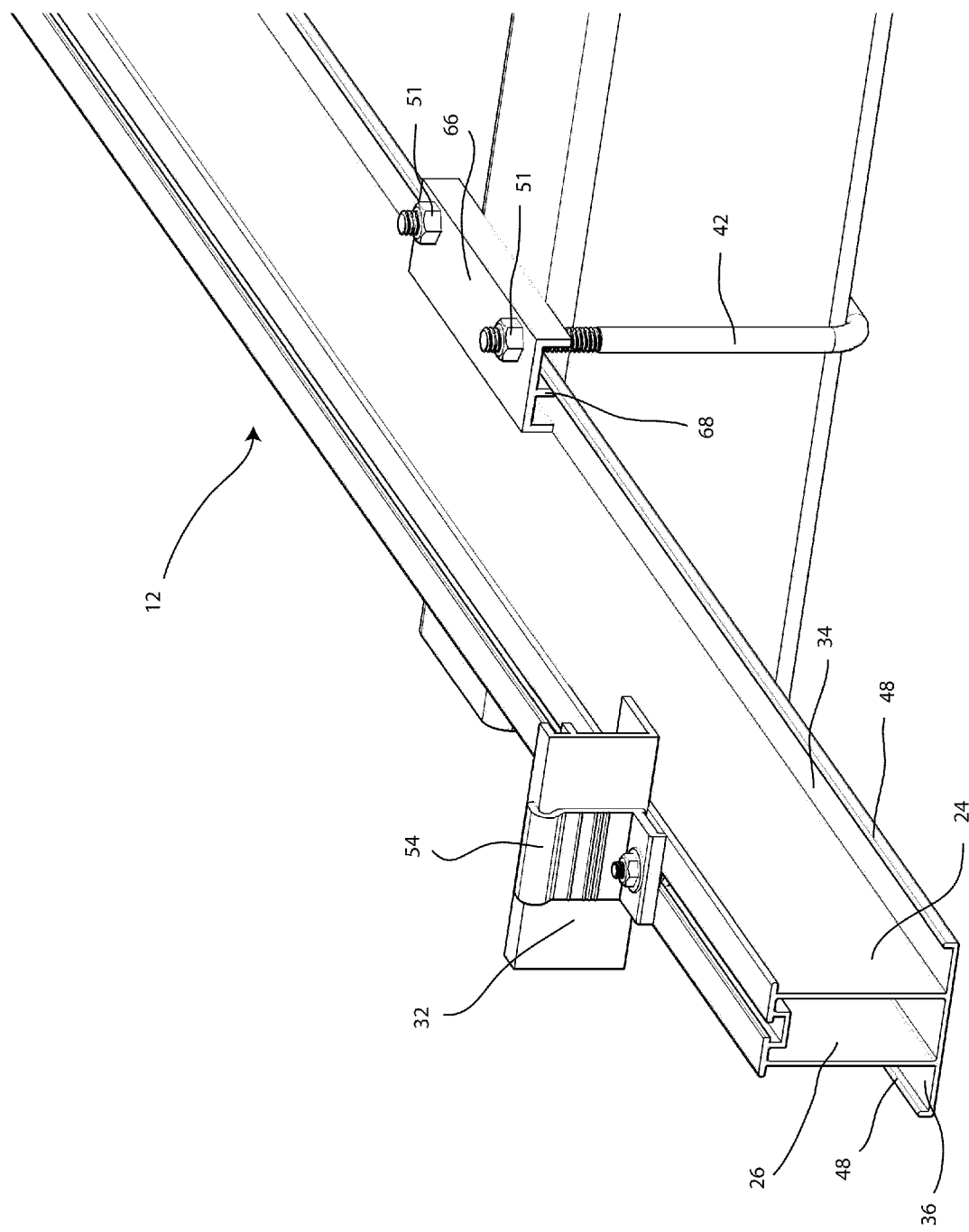
FIG. 7 depicts an enlarged perspective view of an attachment location of the mounting rail of FIGS. 2-6 attached to a horizontal rail with a U-bolt and an alternate saddle clamp.
Figure 8:
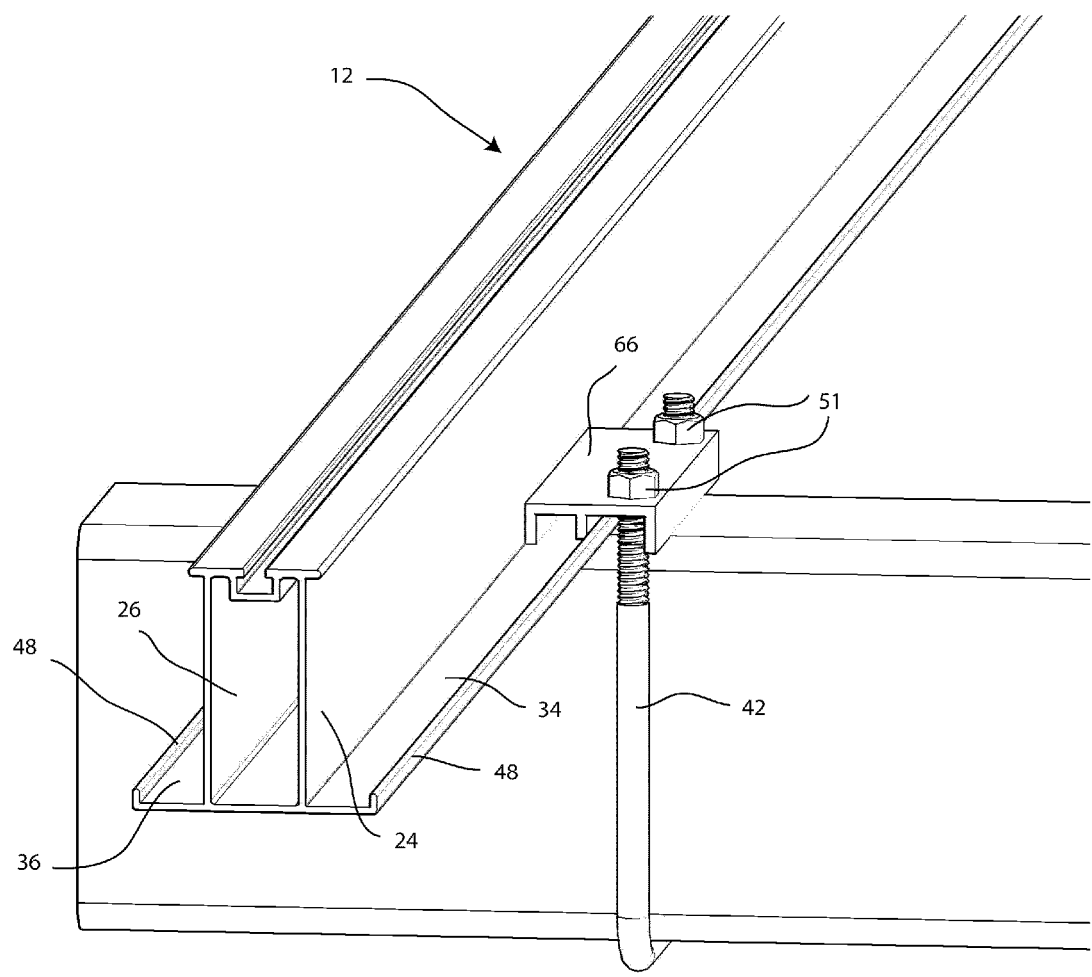
FIG. 8 depicts another enlarged perspective view of the alternate saddle clamp of FIG. 7 attaching the horizontal rail and U-bolt.

In another embodiment shown in FIGS. 7-8, a different clamping element 66 may be utilized with the mounting rail 12. In this case, the mounting rail 12 may not include openings 38 at all. However, the embodiment is not limited to a mounting rail 12 with no openings 38. Rather, the solar array support structure 10 may instead include the clamping element 66 to couple the U-bolt 42, 64 to the mounting rail 12. In this case, the clamping element 66 may include a projection 68 in order to fit within the small channel formed between the vertical elements 24, 26 and the vertical bend 48 at the end of the flanges 34, 36. The projection 68 thereby gives the clamping element 66 an E-shaped cross section. A portion of the cross section of the clamping element 66 is configured to extend over the flanges 34, 36 when the U-bolt connects the clamping element 66 directly to the mounting rail 12. The clamping element 66, like the clamping elements 50, may include openings to receive the ends of the U-bolt 42, 64. Like the previous embodiments, the embodiment depicted in FIGS. 7-8 provide for the U-bolt 42, 64 attaching the horizontal rail 44 with the mounting rail 12 without any additional angle irons 210 or bolts 218. This is because the U-bolt 42, 64 also attaches, retains, and secures the clamping element 66 directly to the mounting rail 12.

Furthermore, it is contemplated that any or all of the components of the solar array support structure 10, as described hereinabove, may be provided in a kit. For example, a solar array installation kit (not show) may include two horizontal rails, such as the horizontal rails 44. The kit may include several mounting rails, such as the mounting rails 12. The kit may further include several front and rear vertical support columns, such as the front and rear support columns 46. The kit may further include U-bolts, such as the U-bolts 42, 64. The kit may include nuts, washers, clamps, and the like. Alternately, it is contemplated that any or all components of the solar array support structure 10 may be preassembled prior to arrival at the installation site.

In a further embodiment, a method of installing a solar array support structure, such as the solar array support structure 10 described herein, is disclosed. The method of installing a solar array support structure may include locating a mounting rail, such as the mounting rail 12, in the proximity to a horizontal rail, such as the horizontal rail 44. Further, the method may include cradling the horizontal rail with a U-bolt, such as one of the U-bolts 42, 64. Moreover, the method may include inserting each end of the U-bolt within a corresponding hole or opening of the mounting rail, such as the openings 38 of the mounting rail 12. The method may then include securely attaching the mounting rail directly to the horizontal rail with the U-bolt.

The method may further include inserting an attachment mechanism, such as the bolt 31 into a channel of the mounting rail, such as the channel 28 described hereinabove. The method may include retaining the attachment mechanism within the channel. The method may then include attaching a solar panel, such as the solar panel 32 to the mounting rail with the attachment mechanism. The method may then include attaching the horizontal rail to a vertical support column that extends from the ground, such as the vertical support column 46 described herein above. The method may also include cradling a second horizontal rail with another U-bolt and inserting each end of the second U-bolt within a corresponding hole or opening of the mounting rail and securely attaching the mounting rail directly to the second horizontal rail.

Elements of the embodiments have been introduced with either the articles "a" or "an." The articles are intended to mean that there are one or more of the elements. The terms "including" and "having" and their derivatives are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

I claim:

1. A solar array support structure comprising:
a vertical support column extending from a ground surface;
a horizontal rail attached to the vertical support column;
a mounting rail extending from a first end to a second end and including a main body having a top and a bottom, the mounting rail further including:
a first vertical element;
a solar panel mounting portion extending along the top of the main body, the solar panel mounting portion configured to receive a solar panel on the mounting rail; and
a first flange extending from a bottom of the first vertical element, the first flange including a first pair of holes spaced apart corresponding to a width of the horizontal rail;
a U-bolt extending through the first pair of holes and attaching the horizontal rail with the mounting rail;
the solar panel attached to the mounting rail, and
a saddle clamp located on the first flange, wherein the U-bolt is inserted into two holes of the saddle clamp;
wherein the mounting rail further includes a second pair of holes configured to receive two ends of a second U-bolt, the second pair of holes spaced apart substantially equal to a width of a second horizontal rail of the solar array support structure, the second pair of holes located in at least one of the first flange and a second flange extending from the bottom of the mounting rail.

2. The solar array support structure of claim 1, wherein the second U-bolt having ends inserted into the second pair of holes of the mounting rail and attaching the second horizontal rail with the mounting rail.

3. The solar array support structure of claim 1, wherein the mounting rail is a dual web mounting rail having a second vertical element.

4. The solar array support structure of claim 1, wherein the mounting rail is attached to the horizontal rail at an acute angle relative the ground surface.

5. The solar array support structure of claim 1, wherein the solar panel mounting portion is a channel extending along the top of the mounting rail.

6. The solar array support structure of claim 5, wherein the channel is configured to receive a head of a bolt from at least one of the first end and the second end such that the head is slidably retained within the channel and the bolt extends from the channel above the top of the mounting rail.

7. A solar array support structure comprising:
a vertical support column extending from a ground surface;
a horizontal rail attached to the vertical support column;
a mounting rail extending from a first end to a second end and including a main body having a top and a bottom, the mounting rail further including:
a first vertical element;
a solar panel mounting portion extending along the top of the main body, the solar panel mounting portion configured to receive a solar panel on the mounting rail; and
a first flange extending from a bottom of the first vertical element;
a clamping element having two openings;
a U-bolt extending through the two openings of the clamping element, wherein the U-bolt attaches the horizontal rail with the mounting rail, and wherein the U-bolt further attaches the clamping element to the first flange; and
the solar panel received by the mounting rail;
wherein the first flange includes a first channel, wherein the clamping element is secured within the first channel by the U-bolt;
wherein the first flange extends to a vertical bend, wherein the first channel is created by the first vertical element, the first flange, and the vertical bend;
wherein the clamping element has an E-shaped cross section.

8. A solar array support structure comprising:
a first vertical support column extending from a ground surface;
a first horizontal rail attached to the first vertical support column;
a second vertical support column;
a second horizontal rail attached to the second vertical support column;
a mounting rail extending from a first end to a second end and including a main body having a top and a bottom, the mounting rail further including:
a first vertical element;
a solar panel mounting portion extending along the top of the main body, the solar panel mounting portion configured to secure a solar panel to the mounting rail; and
a first flange extending from a bottom of the first vertical element, the first flange including a first pair of holes spaced apart corresponding to a width of the first horizontal rail wherein the first pair of holes in the first flange is located proximate the first end and wherein at least one of the first flange and a second flange further includes a second pair of holes located proximate the second end, wherein the second pair of holes are spaced apart corresponding to a width of the second horizontal rail;
a first U-bolt extending through the first pair of holes attaching the first horizontal rail with the mounting rail;
a second U-bolt extending through the second pair of holes attaching the second horizontal rail with the mounting rail; and
the solar panel attached to the mounting rail.

9. The solar array support structure of claim 8, wherein the second flange extends from the bottom of the mounting rail.

10. The solar array support structure of claim 8, wherein the mounting rail is a dual web mounting rail having a second vertical element.

* * * * *